(12) United States Patent
Satsuma et al.

(10) Patent No.: US 7,318,984 B2
(45) Date of Patent: *Jan. 15, 2008

(54) ADHESIVE COMPOSITION-SUPPORTING SEPARATOR FOR BATTERY AND ELECTRODE/SEPARATOR LAMINATE OBTAINED BY USING THE SAME

(75) Inventors: Michio Satsuma, Ibaraki (JP); Keisuke Kii, Ibaraki (JP); Yoshihiro Uetani, Ibaraki (JP); Yutaka Kishii, Ibaraki (JP); Mutsuko Yamaguchi, Ibaraki (JP); Shuuhei Murata, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 217 days.

This patent is subject to a terminal disclaimer.

(21) Appl. No.: 10/422,854

(22) Filed: Apr. 25, 2003

(65) Prior Publication Data

US 2003/0215704 A1 Nov. 20, 2003

(30) Foreign Application Priority Data

May 17, 2002 (JP) .......................... P. 2002-142543

(51) Int. Cl.
*H01M 2/00* (2006.01)
(52) U.S. Cl. ...................... 429/253; 29/632.1
(58) Field of Classification Search ................ 429/253, 429/249; 29/632.1, 623.2, 623.1, 632.2
See application file for complete search history.

(56) References Cited

U.S. PATENT DOCUMENTS

| 5,731,074 | A | 3/1998 | Nishiyama et al. |
| 5,852,119 | A | 12/1998 | Kojima et al. |
| 6,132,904 | A | 10/2000 | Kamino et al. |
| 6,207,248 | B1 | 3/2001 | Yang et al. |
| 6,730,440 | B1 | 5/2004 | Bauer et al. |
| 2001/0049872 | A1 | 12/2001 | Hong |

FOREIGN PATENT DOCUMENTS

| CN | 1174224 A | 2/1998 |
| CN | 1328354 A | 12/2001 |
| EP | 0 563 773 A1 | 10/1993 |
| EP | 0 668 156 A1 | 8/1995 |
| EP | 0 798 791 A2 | 10/1997 |
| EP | 0 852 406 A2 | 7/1998 |
| EP | 1 365 461 A2 | 11/2003 |
| JP | 5-310989 A | 11/1993 |
| JP | 07010957 | * 1/1995 |
| JP | 9-12756 A | 1/1997 |
| JP | 09-161814 A | 6/1997 |
| JP | 10-172606 A | 6/1998 |
| JP | 09206084 | * 7/1998 |
| JP | 11-329439 A | 11/1999 |
| JP | 2001353327 | * 3/2003 |
| WO | WO 97/12412 A1 | 4/1997 |
| WO | WO 00/24068 A1 | 4/2000 |
| WO | 00/62364 A | 10/2000 |
| WO | 02/36516 A2 | 5/2002 |

OTHER PUBLICATIONS

Patent Abstracts of Japan, JP Pub. No. 09-161814, Jun. 20, 1997.
Patent Abstracts of Japan, JP Pub. No. 10-172606, Jun. 26, 1998.
Patent Abstracts of Japan, JP Pub. No. 11-329439, Nov. 30, 1999.
Official Communication from The Patent Office of the People's Republic of China, App. No. 03123620, dated Oct. 14, 2005.

* cited by examiner

*Primary Examiner*—Patrick Joseph Ryan
*Assistant Examiner*—Monique Wills
(74) *Attorney, Agent, or Firm*—Sughrue Mion, PLLC

(57) ABSTRACT

An adhesive composition-supporting separator for a battery includes a porous substrate supporting thereon a thermally cross-linkable adhesive composition comprising a multi-functional isocyanate and a reactive polymer having a functional group capable of reacting with an isocyanato group of the multi-functional isocyanate; an electrode/separator laminate is obtained by contact pressing the adhesive composition-supporting separator for a battery against electrodes; and an electrode/separator bonded material having a cross-linked adhesive composition is obtained by heating the electrode/separator laminate to thereby react the multifunctional isocyanate with the reactive polymer for causing cross-linking.

7 Claims, No Drawings

ADHESIVE COMPOSITION-SUPPORTING SEPARATOR FOR BATTERY AND ELECTRODE/SEPARATOR LAMINATE OBTAINED BY USING THE SAME

FIELD OF THE INVENTION

The present invention relates to an adhesive composition-supporting separator which is useful for battery assembly and which contributes to secure safety upon use of the assembled battery.

BACKGROUND OF THE INVENTION

Hitherto, as a method for manufacturing a battery, there has been known a method of assembling a battery by sandwiching a separator between a positive electrode and a negative electrode in order to prevent shortcircuiting between the electrodes to thereby assemble an electrode/separator laminate and, if necessary after rolling up or laminating, incorporating the electrode/separator laminate in a battery container, then injecting an electrolytic solution into the battery container.

In such battery-manufacturing method, however, each member of the electrode and the separator is liable to mutually deviate upon storage or conveyance of the electrode/separator laminate and, as a result, there have been a problem of a low productivity of batteries and a problem that non-conforming products are liable to be produced. Also, when batteries manufactured from such laminates are used, they might possibly undergo swelling or contraction of the separator to deteriorate battery characteristics or to cause inner shortcircuiting which leads to an increase in temperature of the battery and, in some cases, even to breakage of the battery.

On the other hand, in manufacturing a battery of, particularly, a laminate type, there has been employed, in many cases, a method of bonding an electrode to a separator by using a polyvinylidene fluoride resin solution as an adhesive, and removing a solvent used in the above-mentioned resin solution under reduced pressure. However, this method involves a problems that the steps are complicated, that quality of the resultant products are difficult to stabilize, and that adhesion between the electrode and the separator is insufficient.

SUMMARY OF THE INVENTION

The invention is made to solve the problems as described above which have conventionally been encountered in manufacturing batteries, and an object of the invention is to provide an adhesive composition-supporting separator for a battery which does not cause slippery mutual migration of the constituting members and which, in assembling a battery, enables one to effectively assemble a battery as an electrode/separator bonded material wherein the electrode and the separator are strongly bonded to each other. Further, another object of the invention is to provide an electrode/separator laminate and a bonded material thereof obtained by using the adhesive composition-supporting separator for a battery.

The invention provides an adhesive composition-supporting separator for a battery, which contains a porous substrate supporting thereon a thermally cross-linkable adhesive composition containing a multi-functional isocyanate and a reactive polymer having a functional group capable of reacting with an isocyanato group of the multi-functional isocyanate.

Further, the invention provides an electrode/separator laminate obtained by contact pressing the adhesive composition-supporting separator for a battery against electrodes and an electrode/separator bonded material having a cross-linked adhesive composition obtained by heating the electrode/separator laminate to thereby react the multifunctional isocyanate with the reactive polymer for causing cross-linking.

DETAILED DESCRIPTION OF THE INVENTION

In the invention, the porous film substrate has a thickness of preferably 3 to 100 µm. In case where the film thickness is less than 3 µm, the film is insufficient in strength and might cause inner shortcircuiting whereas, in case where the film thickness exceeds 100 µm, the electrode-to-electrode distance becomes so large that the inner resistance of the battery becomes too large. Also, the porous substrate has fine pores of 0.01 to 5 µm in average pore size.

According to the invention, the porous substrate is not particularly limited as long as it possesses the above-described characteristics but, in consideration of solvent resistance or oxidation-reduction resistance, porous films containing polyolefin resin such as polyethylene or polypropylene are preferred. Among them, polyethylene is particularly preferred as a porous substrate because, when heated, it melts to blank off the pores to give a shut-down function to a battery. Here, the term "polyethylene" as used herein includes both homopolymers of ethylene and copolymers between α-olefin such as propylene, butane or hexane and ethylene. However, according to the invention, a laminate of a porous film of polytetrafluoroethylene or polyimide and a porous film of the above-described polyolefin is preferably used as the porous substrate due to its excellent heat resistance.

The separator for a battery in accordance with the invention contains the porous substrate supporting thereon a thermally cross-linkable adhesive composition composed of a multi-functional isocyanate and a reactive polymer having a functional group capable of reacting with the isocyanato group of the multi-functional isocyanate. In particular, the reactive polymer preferably contains both a (meth)acrylic ester component and a reactive monomer component having an active hydrogen capable of reacting with the isocyanato group of the multi-functional isocyanate.

Further, according to the invention, the reactive polymer may have a glass transition temperature of 0° C. or less, and, with such polymer, the resultant separator for a battery can be contact-pressed to electrodes at room temperature to conduct, so to speak, tentative bonding of the electrodes to the separator. According to the invention, however, the reactive polymer has a glass transition temperature in a range of preferably 0 to 100° C. As is described above, with reactive polymers having a glass transition temperature of 0 to 100° C., it is usually necessary to heat the separator in order to tentatively bond the resultant separator for a battery to electrodes by contact pressing, but they have the advantage that it is not necessary to insert a release paper between separators for a battery in the case of storing in the form of, for example, a laminated state or a roll state.

More particularly, specific examples of the reactive monomer include carboxyl group-containing copolymerizable monomers such as (meth)acrylic acid, itaconic acid and maleic acid ((meth)acrylic acid being preferred), and hydroxyl group-containing copolymerizable monomers such as 2-hydroxyethyl (meth)acrylate and 2-hydroxypropyl (meth)acrylate (hydroxyalkyl (meth)acrylate being preferred). In addition to these monomers, however, amino group-containing copolymerizable monomers may also be used as the reactive monomers.

As the (meth)acrylates, alkyl esters having 1 to 12 carbon atoms in the alkyl group such as ethyl (meth)acrylate, butyl (meth)acrylate, propyl (meth)acrylate, iso-octyl (meth)acrylate, 2-ethylhexyl (meth)acrylate and dodecyl (meth)acrylate are preferably used.

In the invention, the reactive polymer has the above-described reactive monomer in a range of from 0.1 to 20% by weight and preferably a (meth)acrylic ester component and, as needed, a nitrile group-containing copolymerizable monomer component, preferably a (meth) acrylonitrile componment, and a vinyl monomer component such as styrene, α-methylstyrene or vinyl acetate. In particular, in the invention, the reactive polymer preferably has the nitrile group-containing copolymerizable monomer, preferably the (meth)acrylonitrile component, in a content of up to 80% by weight, preferably from 5 to 70% by weight, so as to obtain excellent heat resistance and solvent resistance. In case where the content of the nitrile group-containing copolymerizable monomer component is less than 5% by weight, there results almost no improvement in heat resistance and solvent resistance whereas, in case where the content exceeds 80% by weight, the glass transition temperature of the resultant reactive polymer sometimes exceeds 100° C., thus such content not being preferred. According to the invention, the reactive polymer particularly preferably contains 0.1 to 20% by weight of the reactive monomer, 10 to 95% by weight of the (meth)acrylic ester component and 4.9 to 60% by weight of (meth)acrylonitrile.

Also, according to the invention, acryl-modified fluorine-containing resins having hydroxyl group within the molecule (for example, Cefral Coat FG730B made by Central Glass Co., Ltd.; available as a varnish) may preferably be used as the reactive polymer.

As has been described hereinbefore, with reactive polymers having a glass transition temperature of 40 to 100° C., a adhesive composition-supporting separator obtained by coating on a porous substrate a thermally cross-linkable adhesive composition containing the multi-functional isocyanate and the reactive polymer can be stably stored as it is, and can be kept in a laminated or rolled form without using a release paper. However, such adhesive composition-supporting separator requires to contact press under heating at a temperature at which the multi-functional isocyanate does not react to complete tentative adhesion.

The reactive polymer as described above may be obtained as a polymer solution by copolymerizing given monomers in a solvent such as benzene, toluene, xylene, ethyl acetate or butyl acetate. On the other hand, an aqueous dispersion of the reactive polymer may be obtained by emulsion polymerization. In the emulsion polymerization, it is preferred to use a multi-functional cross-linkable monomer such as divinylbenzene or trimethylolpropane triacrylate in a content of 1% by weight or less in addition to the aforesaid monomers.

Examples of the multi-functional isocyanate include aromatic, aromatic-aliphatic, alicyclic and aliphatic diisocyanates such as phenylene diisocyanate, tolylene diisocyanate, diphenylmethane diisocyanate, diphenyl ether diisocyanate, hexamethylene diisocyanate and cyclohexane diisocyanate; and blocked diisocyantes thereof obtained by reacting these diisocyanates with a so-called blocking agent. As the blocking agent, alcohols, phenols, ε-caprolactam, oximes and active methylol compounds are preferably used.

According to the invention, the reactive polymer obtained in the form of a solution or an aqueous dispersion as described hereinbefore is mixed with the multi-functional isocyanate to obtain a thermally cross-linkable adhesive composition containing the multi-functional isocyanate and the above-described polymer.

According to the invention, in the case where the reactive polymer is used in the form of a solution, an oil-soluble multi-functional isocyanate is preferably used as the multi-functional isocyanate to prepare an oily, thermally cross-linkable adhesive composition and, in the case where the reactive polymer is used in the form of an aqueous dispersion, a water-soluble or water-dispersible one is used as the multi-functional isocyanate to prepare an aqueous, thermally cross-linkable adhesive composition. Also, in the case of preparing the oily, thermally cross-linkable adhesive composition, an organic solvent such as methyl ethyl ketone or methyl isobutyl ketone or an inorganic fine powder such as fine powder of heavy calcium carbonate or $SiO_2$ may be compounded in a content of 50% by weight or less as a fluidity-improving agent.

In such thermally cross-linkable adhesive composition, the ratio of the multi-functional isocyanate is usually in the range of from 0.1 to 20 parts by weight per 100 parts by weight of the reactive polymer. In case where the ratio of the multi-functional isocyanate is less than 0.1 part by weight per 100 parts by weight of the reactive polymer, there results an insufficient cross-linking of the reactive polymer with the multi-functional isocyanate, and the resultant electrode/separator bonded material fails to establish a strong adhesion between the electrode and the separator. On the other hand, in case where the ratio of the multi-functional isocyanate exceeds 20 parts by weight per 100 parts by weight of the reactive polymer, there results a too hard cross-linked adhesive composition which, in some cases, might spoil close contact properties between the separator and the electrode.

The thus-obtainable thermally cross-linkable adhesive composition is coated on the porous substrate using a proper coating means such as a gravure coater, a silk-screen coater or a spray coater, followed by removing the used solvent by heating, if necessary, to a temperature at which the multi-functional isocyanate does not react to thereby obtain the adhesive-supporting separator for a battery in accordance with the invention.

According to the invention, the thermally cross-linkable adhesive composition is be coated on both sides of the porous substrate to prepare a separator for a battery, and electrodes, that is, a negative electrode and a positive electrode are contact bonded respectively on both sides thereof or, alternatively, the thermally cross-linkable adhesive composition is coated on only one side of the porous substrate to prepare a separator for a battery, and an electrode, that is, either a negative electrode or a positive electrode is contact bonded.

According to the invention, it is preferred, upon coating the thermally cross-linkable adhesive composition to the porous substrate, to coat the composition in part, i.e., in a spotted pattern, a lattice pattern, a stripe pattern or a hexagonal pattern. In particular, by coating the thermally cross-linkable adhesive composition in 5 to 50% of the area of the surface of the porous substrate to be coated with the adhesive composition, there can be obtained a strong adhesion between the electrode and the separator, and such electrode/separator bonded material can provide a battery having excellent properties.

In the invention, the thickness of the coated thermally cross-linkable adhesive composition to the porous substrate is not limited at all but, usually, the thickness is suitably 0.1 to 20 μm. In particular, in the case of coating the composition all over the surface of the porous substrate, the thickness is suitably in the range of from 0.1 to 10 μm. In case where the thickness is too large, properties of the resultant battery are adversely affected whereas, in case where the thickness is too small, the electrode and the separator can not be bonded with a practical adhesion strength. On the other hand, in the case of coating the adhesive composition partly on the surface of the porous substrate according to the invention, the thickness of the coated adhesive composition is preferably in the range of from 0.2 to 20 μm.

Next, a method for manufacturing (assembling) a battery using the adhesive composition-supporting separator for a battery according to the invention is described below.

In the invention, as a negative electrode and a positive electrode, a sheet obtained by supporting an active material and, as needed, an electrically conductive agent, on an electrically conductive substrate using a resin binder is generally used, though being different depending upon the kind of the battery.

According to the invention, the negative electrode and the positive electrode are respectively disposed along the thus-obtained, thermally cross-linkable adhesive composition-supporting porous substrate as a separator and, preferably under heating to a temperature at which the multi-functional isocyanate does not react, they are contact pressed to each other to obtain an electrode/separator laminate. Therefore, according to the invention, in this electrode/separator laminate, the multi-functional isocyanate in the thermally cross-linkable adhesive composition is in a substantially non-reacted state, with the adhesive composition not being cross-linked nor cured.

Thus, according to the invention, a negative electrode is disposed along the surface of the thermally cross-linkable adhesive composition-supporting porous substrate, and a positive electrode is disposed along the back surface of the thermally cross-linkable adhesive composition-supporting porous substrate with the multi-functional isocyanate in the thermally cross-linkable adhesive composition being in a substantially non-reacted state, then the three members are contact pressed to each other preferably under heating to a temperature at which the multi-functional isocyanate in the thermally cross-linkable adhesive composition does not react, to thereby press part of the adhesive composition into the electrodes to conduct, so to speak, tentative bonding of the electrodes and the porous substrate. Then, the laminate is heated to react the multi-functional isocyanate with the reactive polymer to cross-link and cure the adhesive composition, thus an electrode/separator bonded material being obtained. That is, the electrodes are, so to speak, completely bonded to the porous substrate. Therefore, in such electrode/separator bonded material, the separator and the electrodes are strongly bonded to each other. As has been described hereinbefore, the electrode/separator bonded material includes both a negative electrode/separator/positive electrode bonded material and a negative electrode or positive electrode/separator bonded material.

As is described above, according to the invention, the thermally cross-linkable adhesive composition-supporting porous substrate is contact pressed against the electrode(s) to thereby press part of the adhesive composition into the electrode(s), and the laminate is heated to cross-link and cure the adhesive composition to obtain an electrode/separator bonded material. Hence, a practically sufficient strong adhesion can be obtained between the porous substrate and the electrode even when the thickness of the thermally cross-linkable adhesive composition coated on the porous substrate is not so large, for example, about 5 μm.

Next, a battery can be obtained by disposing the electrode/separator bonded material(s) in a battery vessel after, as needed, rolling up or laminating, then filling the battery vessel with an electrolytic solution, followed by sealing the battery vessel.

The electrolytic solution is a solution obtained by dissolving an electrolyte salt in a solvent. As the electrolyte salt, those salts may be used which contain a cation component such as hydrogen, an alkali metal (e.g., lithium, sodium or potassium), an alkaline earth metal (e.g., calcium or strontium) or a tertiary or a quaternary ammonium salt and an anion component such as an inorganic acid (e.g., hydrochloric acid, nitric acid, phosphoric acid, sulfuric acid, borofluoric acid, hydrofluoric acid, hexafluorophosphoric acid or perchloric acid) or an organic acid (e.g., organic carboxylic acid, organic sulfonic acid or fluorine-substituted organic sulfonic acid). Of these, electrolyte salts containing an alkali metal ion as the cation component are preferably used.

As the solvent for the electrolytic solution, any solvent that can dissolve the electrolyte salt may be used. As non-aqueous solvents, cyclic esters such as ethylene carbonate, propylene carbonate, butylenes carbonate and γ-butyrolactone, ethers such as tetrahydrofuran and dimethoxyethane, and chained esters such as dimethyl carbonate, diethyl carbonate and ethyl methyl carbonate may be used. These solvents may be used alone or as a mixture of two or more of them.

The invention is described by reference to examples which, however, do not limit the invention in any way.

EXAMPLE 1

(Preparation of a Thermally Cross-Linkable Adhesive Composition and Preparation of an Electrode/separator Laminate Using the Same)

| | |
|---|---|
| Acrylonitrile | 10 parts by weight |
| Methacrylic acid | 5 parts by weight |
| Butyl acrylate | 30 parts by weight |
| Ethyl acrylate | 60 parts by weight |
| Polyethylene glycol alkyl-phenyl ether | 3 parts by weight |
| n-Dodecylmercaptan | 0.08 part by weight |
| Potassium persulfate | 0.3 part by weight |
| Ion-exchanged water | 300 parts by weight |

The above-described mixture was subjected to emulsion polymerization in a conventional manner to obtain an aqueous dispersion of a reactive polymer. This reactive polymer had a weight-average molecular weight of about 850,000 and a glass transition temperature of −13° C. 10% hydrochloric acid was added to this aqueous dispersion of the reactive polymer to precipitate the reactive polymer, followed by taking out the reactive polymer. After well washing with water, the reactive polymer was dried under reduced pressure.

15 parts of $SiO_2$ fine powder of 12 nm in average particle size was added to 100 parts of the thus-obtained reactive polymer, and the mixture was dissolved in a toluene/methyl ethyl ketone (75/25 by weight) to prepare a 20% solution of the reactive polymer.

Next, 2.7 parts of a blocked hexamethylene diisocyanate prepared by adding 1 part by mol of trimethylolpropane to 3 parts by mol of hexamethylene diisocyanate was compounded with 100 parts (as solid components) of the reactive polymer solution to prepare a thermally cross-linkable adhesive composition. After coating this all over the surface side and the back side of a polyethylene resin-made porous film (thickness: 25 μm; voids: 50%; average pore size: 0.1 μm), the coating was dried and freed of the solvent to thereby support the thermally cross-linkable adhesive composition (thickness: 0.7 μm) on the polyethylene resin-made porous film.

(Preparation of Electrodes)

Lithium cobaltate ($LiCoO_2$) of 15 μm in average particle size, graphite powder and a polyvinylidene fluoride resin were mixed in a mixing ratio of 85:10:5 by weight, and the mixture was added to N-methyl-2-pyrrolidone to prepare a slurry containing 15% by weight of solid components. This slurry was coated on the surface of a 20-μm thick aluminum foil in a thickness of 200 μm using a coating machine, followed by drying at 80° C. for 1 hour. Subsequently, the above-described slurry was similarly coated on the back side of the aluminum foil in a thickness of 200 μm and, after drying at 120° C. for 2 hours, the foil was passed through a roll press to prepare a 200-μm thick positive electrode sheet.

Graphite powder and a polyvinylidene fluoride resin were mixed in a mixing ratio of 95:5 by weight, and the mixture was added to N-methyl-2-pyrrolidone to prepare a slurry containing 15% by weight of solid components. This slurry was coated on the surface of a 20-μm thick copper foil in a thickness of 200 μm using a coating machine, followed by drying at 80° C. for 1 hour. Subsequently, the above-described slurry was similarly coated on the back side of the copper foil in a thickness of 200 μm and, after drying at 120° C. for 2 hours, the foil was passed through a roll press to prepare a 200-μm thick negative electrode sheet.

(Preparation of a Negative Electrode/Separator/Positive Electrode Laminate)

The positive electrode sheet was disposed along the surface of the aforementioned adhesive composition-supporting porous film, and the negative electrode sheet was disposed along the back surface of the film. Then, the three members were heated to a temperature of 80° C. for 5 minutes under a pressure of 5 kg/cm$^2$ to thereby contact press the positive electrode sheet and the negative electrode sheet against the porous film. Subsequently, the laminate was kept in a 50° C. thermostatic chamber for 7 days to react the multi-functional isocyanate with the reactive polymer for causing cross-linking. Thus, there was obtained a negative electrode/separator/positive electrode bonded material.

(Assembly of a Battery and Evaluation of the Resultant Battery)

An electrolyte salt of lithium hexafluorophosphate ($LiPF_6$) was dissolved in a mixed solvent of ethylene carbonate/ethyl methyl carbonate (½ by volume) in an argon-substituted globe box so that the concentration became 1.2 mols/liter. Thus, there was prepared an electrolytic solution.

The negative electrode/separator/positive electrode bonded material was placed in a 2016-size can for a coin-type battery functioning as both a positive electrode plate and a negative electrode plate and, after injecting the electrolytic solution into the can of the coin-type battery, the can for a battery was sealed to assembly a coin-type lithium ion secondary battery.

This battery was subjected to 5-time charge-discharge cycles at a rate of 0.2 CmA, then charged at a rate of 0.2 CmA. Further, it was discharged at a rate of 2.0 CmA. The discharge load property of the electrolyte evaluated in terms of the ratio of a discharge capacity at a rate of 2.0 CmA/a discharge capacity at a rate of 0.2 CmA was 91%.

Also, after the charge-and-discharge test, swelling properties of the battery were evaluated. The term "swelling properties" as used herein means the phenomenon that the separator floats from the electrodes by the generation of bubbles in the electrolytic solution or the elongation or shrinkage of the electrode sheet bonded to the separator. After the charge-and-discharge test, the battery was decomposed, and the separator was observed to evaluate it. Thus, no swelling was observed.

EXAMPLE 2

In the procedures of Example 1, the thermally cross-linkable adhesive composition was coated on both sides of the polyethylene resin-made porous film in a spotted pattern of 50% of the area of each side, then dried to remove the solvent. Thus, the thermally cross-linkable adhesive composition was supported on the polyethylene resin-made porous film.

A negative electrode/separator/positive electrode bonded material was obtained by using the thus-obtained polyethylene resin-made porous film supporting thereon the thermally cross-linkable adhesive composition in the same manner as in Example 1, and a coin-type lithium ion secondary battery was assembled using this in the same manner as in Example 1. The resultant battery was evaluated in terms of discharge load property of the electrolyte in the same manner as in Example 1, and was found to be 95%. No swelling was found in the battery.

EXAMPLE 3

In the procedure of Example 1, the thermally cross-linkable adhesive composition was prepared by using 5 parts of diphenylmethane diisocyanate in place of the blocked hexamethylene diisocyanate, and the composition was coated on both sides of the polyethylene resin-made porous film in a spotted pattern of 30% of the area of each side, then dried to remove the solvent. Thus, the thermally cross-linkable adhesive composition was supported on the polyethylene resin-made porous film.

A negative electrode/separator/positive electrode bonded material was obtained by using the thus-obtained polyethylene resin-made porous film supporting thereon the thermally cross-linkable adhesive composition in the same manner as in Example 1, and a coin-type lithium ion secondary battery was assembled using this in the same manner as in Example 1. The resultant battery was evaluated in terms of discharge load property of the electrolyte in the same manner as in Example 1, and was found to be 92%. No swelling was found in the battery.

EXAMPLE 4

| | |
|---|---|
| Acrylonitrile | 40 parts by weight |
| 2-Hydroxyethyl acrylate | 2 parts by weight |
| Methyl methacrylate | 10 parts by weight |
| 2-Ethylhexyl acrylate | 50 parts by weight |
| Azobisisobutyronitrile | 0.3 part by weight |
| Toluene | 300 parts by weight |

The above-described mixture was subjected to solution polymerization in a conventional manner to obtain a solution of a reactive polymer in toluene. The reactive polymer had a weight-average molecular weight of about 300,000 and a glass transition temperature of 5° C. 5 parts of a blocked hexamethylene diisocyanate obtained by adding 1 part by mol of trimethylolpropane to 3 parts by mol of hexamethylene diisocyanate was mixed with 100 parts (as solid components) of the reactive polymer solution to prepare a thermally cross-linkable adhesive composition. This composition was coated on both sides of a polyethylene resin-made porous film in a spotted pattern of 30% of the area of each side, then dried to remove the solvent. Thus, the thermally cross-linkable adhesive composition was supported on the polyethylene resin-made porous film.

A negative electrode/separator/positive electrode bonded material was obtained by using the thus-obtained polyethylene resin-made porous film supporting thereon the thermally cross-linkable adhesive composition in the same manner as in Example 1, and a coin-type lithium ion secondary battery was assembled using this in the same manner as in Example 1. The resultant battery was evaluated in terms of discharge load property of the electrolyte in the same manner as in Example 1, and was found to be 93%. No swelling was found in the battery.

EXAMPLE 5

2.7 parts of a blocked hexamethylene diisocyanate obtained by adding 1 part by mol of trimethylolpropane to 3 parts by mol of hexamethylene diisocyanate and 60 parts of acryl-modified fluorine-containing resin varnish (Cefral Coat FG730B; made by Central Glass Co., Ltd.; hydroxy value: 8 mgKOH; weight-average molecular weight: about 200,000; glass transition temperature of the film: 75° C.) were dissolved in 20 parts of toluene to prepare a thermally cross-linkable adhesive composition. This thermally cross-linkable adhesive composition was coated all over the both sides of a polyethylene resin-made porous film, then dried to remove the solvent. Thus, the thermally cross-linkable adhesive composition (thickness: 0.7 µm) was supported on the polyethylene resin-made porous film.

A negative electrode/separator/positive electrode bonded material was obtained by using the thus-obtained polyethylene resin-made porous film supporting thereon the thermally cross-linkable adhesive composition in the same manner as in Example 1, and a coin-type lithium ion secondary battery was assembled using this in the same manner as in Example 1. The resultant battery was evaluated in terms of discharge load property of the electrolyte in the same manner as in Example 1, and was found to be 93%. No swelling was found in the battery.

COMPARATIVE EXAMPLE 1

A battery was assembled using the same polyethylene resin-made porous film as used in Example 1 without supporting the thermally cross-linkable adhesive composition. That is, the positive electrode sheet was disposed along the surface of the polyethylene resin-made porous film, and the negative electrode sheet was disposed along the back surface thereof to prepare a laminate.

The same procedures as in Example 1 were conducted except for using the laminate in place of the electrode/separator bonded material to assemble a coin-type lithium ion secondary battery. The resultant battery was evaluated in terms of discharge load property of the electrolyte in the same manner as in Example 1, and was found to be 85%. Swelling was found in the battery.

The adhesive composition-supporting separator for a battery in accordance with the invention contains a porous substrate having supported thereon a thermally cross-linkable adhesive composition containing a multi-functional isocyanate and a reactive polymer having a functional group capable of reacting with the isocyanato group of the multi-functional isocyanate. According to the invention, an electrode is pressed against the thermally cross-linkable adhesive composition-supporting porous substrate to thereby, so to speak, tentatively bond the electrode to the porous substrate and form an electrode/separator laminate, and the laminate is heated to react the multi-functional isocyanate with the reactive polymer to cross-link and cure the adhesive composition. Thus, the electrode is bonded to the porous substrate to obtain an electrode/separator bonded material.

Accordingly, the electrode/separator laminate of the invention does not suffer deviation of the members thereof from each other, and an electrode/separator bonded material obtained therefrom can establish a strong adhesion between the electrode and the separator, which enables one to assemble a battery with a high efficiency. Further, in the thus-obtained battery, no swelling occurs, and a rise in temperature of the battery to be caused by heat generation upon abnormal shortcircuiting can be depressed.

While the invention has been described in detail and with reference to specific embodiments thereof, it will be apparent to one skilled in the art that various changes and modifications can be made therein without departing from the spirit and scope thereof.

What is claimed is:

1. An adhesive composition-supporting separator for a battery, which comprises a porous substrate supporting thereon a thermally cross-linkable adhesive composition comprising a multi-functional isocyanate and a reactive polymer having a functional group capable of reacting with an isocyanato group of the multi-functional isocyanate, wherein the multi-functional isocyanate and the reactive polymer are in an uncrosslinked state.

2. The adhesive composition-supporting separator for a battery as claimed in claim 1, wherein the reactive polymer has a carboxyl group or a hydroxyl group as the functional group capable of reacting with the isocyanato group.

3. The adhesive composition-supporting separator for a battery as claimed in claim 1, wherein the reactive polymer has both a (meth)acrylic acid ester component. and at least one reactive monomer component selected from the group consisting of a (meth)acrylic acid component and a hydroxyalkyl (meth)acrylate component.

4. The adhesive composition-supporting separator for a battery as claimed in claim 3, wherein the reactive polymer has a (meth)acrylonitrile component.

5. The adhesive composition-supporting separator for a battery as claimed in claim 1, wherein the reactive polymer has a glass transition temperature of from 0 to 100° C.

6. An electrode/separator laminate obtained by contact pressing an adhesive composition-supporting separator for a battery against electrodes, said adhesive composition-supporting separator for a battery comprising a porous substrate supporting thereon a thermally cross-linkable adhesive composition comprising a multi-functional isocyanate and a reactive polymer having a functional group capable of reacting with an isocyanato group of the multi-functional isocyanate.

7. An electrode/separator bonded material having a cross-linked adhesive composition, which is obtained by heating an electrode/separator laminate to thereby react a multi-functional isocyanate with a reactive polymer for causing cross-linking, said electrode/separator laminate being obtained by contact pressing an adhesive composition-supporting separator for a battery against electrodes, said adhesive composition-supporting separator for a battery comprising a porous substrate supporting thereon a thermally cross-linkable adhesive composition comprising the multi-functional isocyanate and the reactive polymer having a functional group capable of reacting with an isocyanato group of the multi-functional isocyanate.

* * * * *